(12) United States Patent
Stoff

(10) Patent No.: US 8,869,951 B2
(45) Date of Patent: Oct. 28, 2014

(54) MODULAR BRAKE DEVICE

(75) Inventor: Helmut Stoff, Otterfing (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 12/867,085

(22) PCT Filed: Feb. 9, 2009

(86) PCT No.: PCT/EP2009/051430
§ 371 (c)(1),
(2), (4) Date: Aug. 11, 2010

(87) PCT Pub. No.: WO2009/101042
PCT Pub. Date: Aug. 20, 2009

(65) Prior Publication Data
US 2011/0031073 A1    Feb. 10, 2011

(30) Foreign Application Priority Data
Feb. 12, 2008  (DE) .......................... 10 2008 009 217

(51) Int. Cl.
*F16D 65/14*    (2006.01)
*B61H 11/00*    (2006.01)
*B60T 17/02*    (2006.01)
*B61C 17/00*    (2006.01)
*B60T 17/04*    (2006.01)

(52) U.S. Cl.
CPC ................. *B61C 17/00* (2013.01); *B60T 17/02* (2013.01); *B60T 17/04* (2013.01)
USPC ....... 188/107; 188/1.11 E; 188/3 R; 188/158; 188/112 R; 188/170; 188/171; 303/7; 303/13; 303/15

(58) Field of Classification Search
USPC .......... 188/107, 170, 106 R, 235, 162, 153 R, 188/158, 3 R, 3 H, 34, 112 R, 21, 3, 181, 188/242, 244, 171, 105, 72.1; 303/13, 3, 303/15, 20, 7; 417/321, 313; 105/26.05, 105/396, 463.1

IPC ........................ B61H 11/02; B60T 17/04,17/06
See application file for complete search history.

(56) References Cited

U.S. PATENT DOCUMENTS

| | | | | |
|---|---|---|---|---|
| 6,059,075 | A | * | 5/2000 | Saxton et al. ................. 188/107 |
| 6,086,163 | A | * | 7/2000 | Klink et al. ........................ 303/7 |
| 2009/0167075 | A1 | * | 7/2009 | Wright et al. ................ 303/22.2 |
| 2009/0220359 | A1 | * | 9/2009 | Koeck et al. ................... 417/321 |

FOREIGN PATENT DOCUMENTS

| | | |
|---|---|---|
| DE | 19715528 A1 | 11/1997 |
| DE | 19908617 A1 | 9/2000 |
| DE | 102006010723 A1 | 9/2007 |

(Continued)

OTHER PUBLICATIONS

"Automatische Bremsausrüstung und Druckluftausrüstung für Fahrbetriebsmittel von Schienentransport" Katalog von Zusatzausrüstungen, Moskau, ACTO, p. 102, Abb. 116, 148, 149, 2003—Statement of Relevance.

*Primary Examiner* — Anna Momper
*Assistant Examiner* — San Aung
(74) *Attorney, Agent, or Firm* — Laurence A. Greenberg; Werner H. Stemer; Ralph E. Locher

(57) ABSTRACT

A brake system for a rail-guided tractive vehicle includes electronic, pneumatic, and mechanical components, as well as vehicle interfaces for connecting the brake system to the tractive vehicle. The invention provides a brake system that can be adapted easily and economically to different requirements of the customers, and in particular to different locomotives. For that purpose, the components are housed in modules respectively having predetermined spatial measurements and each module has at least one predetermined electric or pneumatic vehicle interface, with respect to their spatial position within the module and also with respect to their operational variables.

16 Claims, 9 Drawing Sheets

(56) References Cited

FOREIGN PATENT DOCUMENTS

| FR | 2798345 A1 | 3/2001 |
| JP | 2007-261533 | * 10/2007 |
| RU | 46983 U1 | 8/2005 |
| WO | 9529831 A1 | 11/1995 |

* cited by examiner

MODULAR BRAKE DEVICE

BACKGROUND OF THE INVENTION

1. Field of the Invention:

The invention relates to a brake device for a rail-guided tractive vehicle having electronic, pneumatic and mechanical components and having vehicle interfaces for connecting the brake device to the tractive vehicle.

Such a brake device, which is also referred to as a compressed air device, is already known from the prior art. Previously known brake devices for rail vehicles generally comprise tightly packed pneumatic components, electronic assemblies, for example for controlling the pneumatic components, and one or more compressors, dryers, filters, pressure vessels and the like. Such brake devices are generally standardized only for one type of locomotive and have identical equipment only for this type of locomotive. A standard configuration for different rail vehicles is, however, not always possible. Therefore, different types of locomotive generally entail correspondingly adapted brake devices. Different customer requirements also necessitate a different design for the brake device. Basic standardization of the brake device is therefore ruled out from the outset. The previously known brake device is subject to the disadvantage that changing a component can entail a complete redesign of the brake device with a correspondingly high degree of engineering expenditure.

BRIEF SUMMARY OF THE INVENTION

The invention is therefore based on the object of making available a brake device of the type mentioned at the beginning which can be adapted easily, and therefore cost effectively, to different requirements of the customer, and in particular to different locomotives.

The invention solves this problem by virtue of the fact that the components are accommodated in modules which each have a predefined spatial dimension, wherein each module has at least one electrical or pneumatic vehicle interface which is predefined both in terms of its spatial position within the module and in terms of its operational variable.

According to the present invention, the brake device is composed of predefined modules. The modules are predefined in terms of their spatial dimension, that is to say in other words in terms of their dimensioning. The arrangement of the components within the modules can vary according to the invention. However, each module has an electric or pneumatic vehicle interface which is also predefined in terms of the spatial position and at which the brake device according to the invention can be connected to the rail vehicle, for example a locomotive. The invention is based on the realization that the installation space within a tractive vehicle, for example a locomotive, is very limited. It is only this limited installation space that makes it necessary to extensively reconfigure the brake device if one of the components has to be replaced owing to any regulation or for some other reason. As a result of the definition of modules of specific size, it is easily possible to combine the modules with one another, with the exchange of one component to the respective module in which the component is provided remaining limited. The brake device according to the invention can therefore be easily, quickly and cost effectively adapted to any desired rail vehicle topology. It is therefore possible, for example, to retrofit the brake device from one electric locomotive which possibly has just a single central corridor in the machine space, to a brake device for a diesel-electric locomotive which, owing to the diesel engine, has two side passages to the right and left of the diesel engine.

At least two modules from the group A, B, C and D are expediently combined with one another.

According to one development which is expedient in this regard, the module A comprises a brake panel having pneumatic components, and an electronic cabinet having electronic components. The pneumatic components of the pneumatic brake are usually combined in the brake panel. The brake panel according to the invention therefore has, for example, control valves, double non-return valves, solenoid valves or the like. In contrast, the electronic cabinet includes the electronic components for controlling the pneumatic components of the brake panel. For example the train control device (TCD), brake control device (BCD) and any other open-loop and closed-loop control units for actuating the control valves or the like are thus provided in the electronic cabinet.

The modules B and D expediently each comprise compressed air vessels. In this context, the compressed air vessels are of circular cylindrical configuration, for example with a diameter of 500 and/or 300 mm so that the modules B and D can be made available with different module depths. The number of compressed air vessels provided in the respective module can in turn vary as a function of the respective requirement.

The module C expediently comprises a compressor, an air dryer, an air filter, a condensate container, a minimum pressure valve and/or auxiliary compressor. Instead of the auxiliary compressor, an auxiliary pressure supply is also possible as a component. Said assemblies or components of the brake device are required to compress and dry the ambient air, clear it of impurities and subsequently store it in the compressed air vessels, for example module B or D.

According to one preferred embodiment, the modules have, in an end view, a predefined width in the lateral direction, a predefined height and a depth which is selected from a group of modular dimensions. According to one advantageous embodiment, all the modules have the same width and the same height, with the depth being able to vary. However, the depth of a module is not random here. Instead, the depth is selected from the group of the modular dimensions. Therefore, the module has, for example, a depth of 300 mm, 700 mm or 500 mm, so that by combination of a module with a depth of 300 mm and a module with a depth of 700 mm and a module with a depth of 500 mm, a total depth of 1500 mm is made available as a sum of the depths of the three modules.

Further expedient refinements and advantages of the invention are the subject matter of the following description of exemplary embodiments of the invention with reference to the figures of the drawing, in which identical reference signs refer to identically acting components, and in which:

DESCRIPTION OF THE INVENTION

Figure 1:
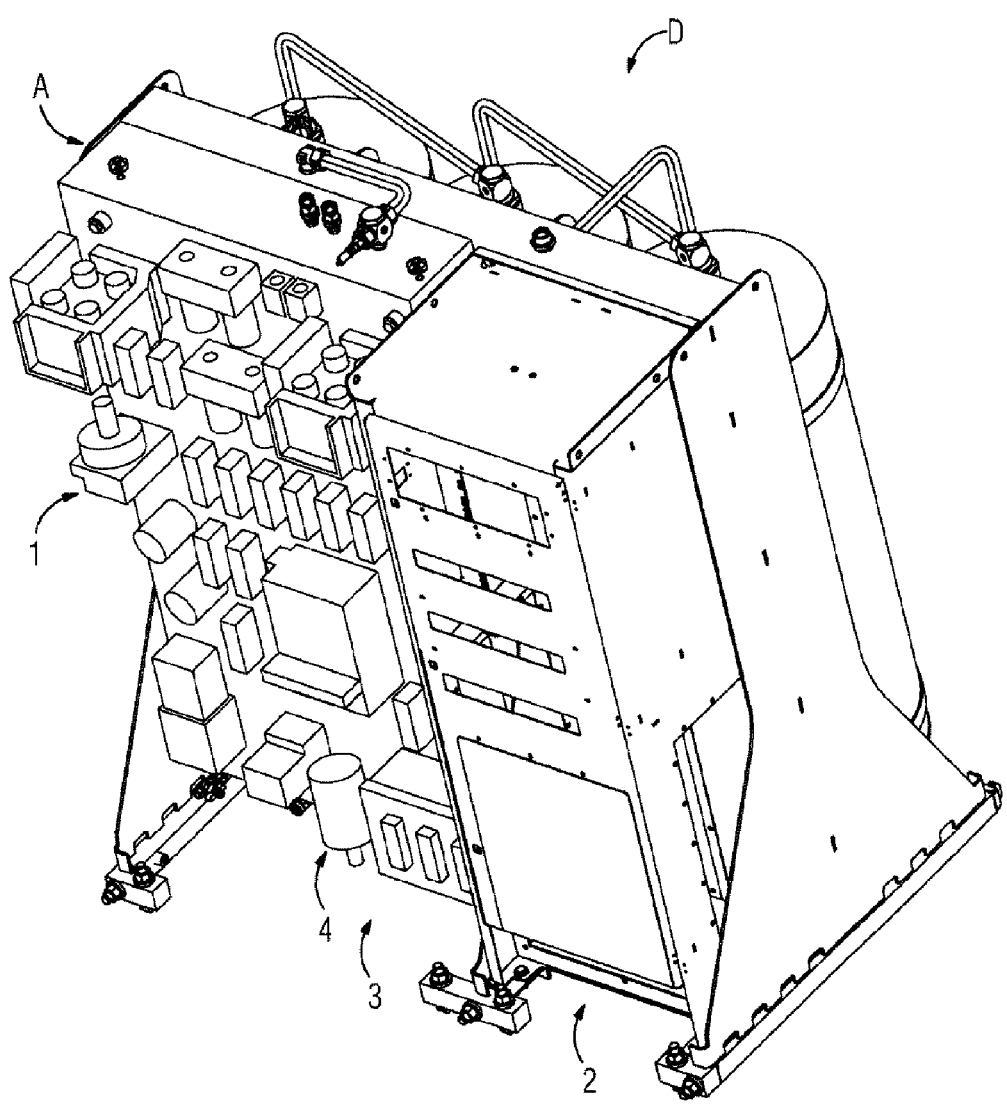
FIG. 1 shows an exemplary embodiment of a module A of the brake device according to the invention in a perspective illustration.

FIG. 1 shows an exemplary embodiment of the modules A and B in a perspective illustration, the module A facing the viewer. It is clear that the module A is composed of a brake panel 1 and an electronic cabinet 2. The brake panel 1 comprises a plurality of pneumatic components, such as control valves, double non-return valves, pressure limiter valves and the like, the arrangement of which within the module A or within the brake panel 1 is random and therefore more details on it are not necessary here. On the other hand, the electronic cabinet 2 comprises electronic components which are provided for actuating the electrically actuable valves in the brake panel 1. Furthermore, the electronic cabinet 2 in the exemplary embodiment shown comprises the train control device. An electronic standard interface 3, which is arranged in the lower region of the module B approximately in the central position, is provided for connecting the electric or electronic components of the electronic cabinet 2 to the tractive vehicle. A pneumatic standard interface 4 is provided in the module A for connecting the pneumatic components of the brake panel 1. The position of said interfaces 3, 4 within the module is not dependent on the rest of the configuration of the module, and in other words is therefore always constant.

Figure 2:
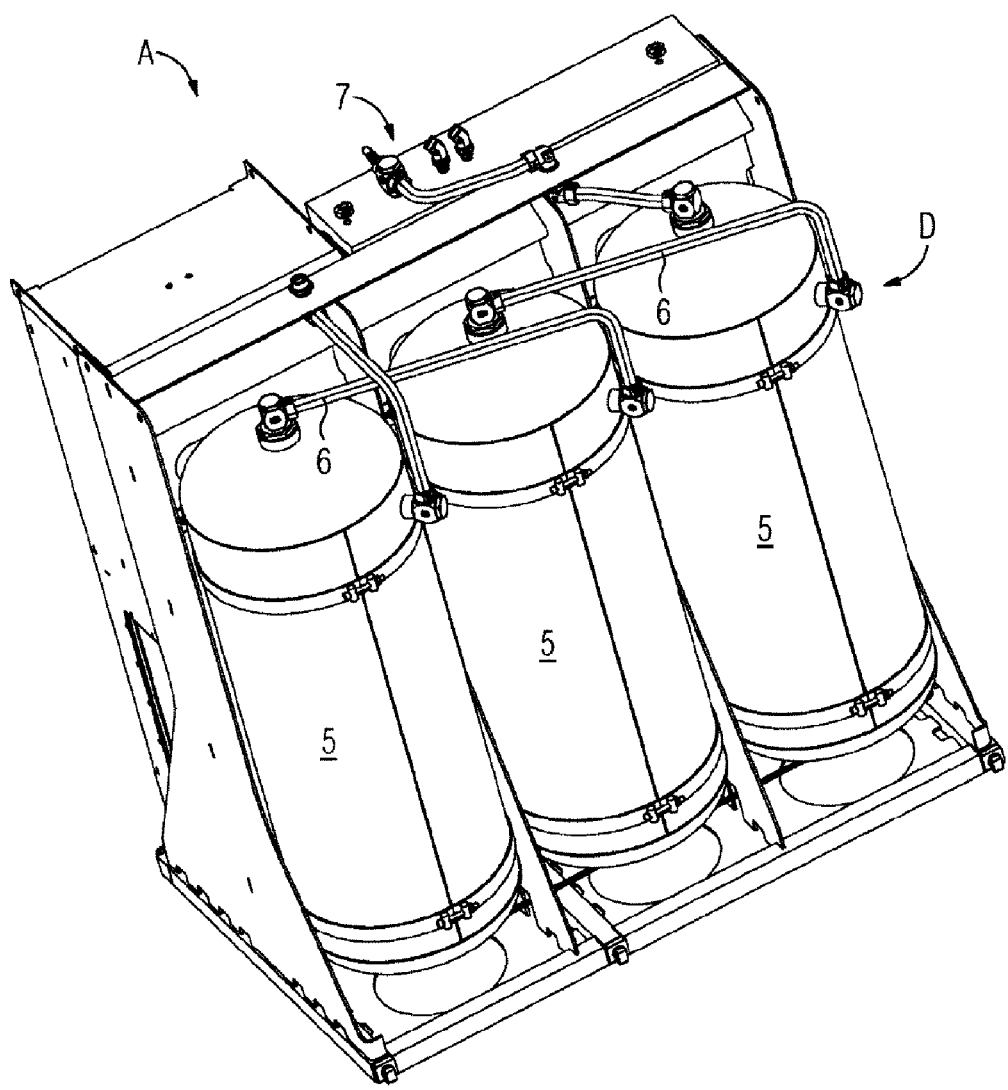
FIG. 2 shows an exemplary embodiment of the module D of the brake device according to the invention in a perspective illustration.

FIG. 2 shows, like FIG. 1, the modules A and D, but in FIG. 2 the module D is facing the viewer. It is apparent that the module D is composed of three main air vessels 5, each with an internal volume of 250 liters. The main air vessels 5 are connected to one another via connecting lines 6, with a standard interface 7 being provided for pneumatically connecting the main air vessels 5 to the rail vehicle or to other modules of the brake device. The main air vessels 5 are of circular cylindrical design and have an external diameter of approximately 500 mm, so that the module D also has approximately a depth of 500 mm. The module A on the rear side of the module D has a depth of 500 mm, so that by combining the modules A and D a total depth of 1000 mm is achieved. In contrast to the depth of the modules, all the modules have the same height and same width. Expediently the width of the modules is between 1 and 2 meters, and the height is likewise between 1 and 2 meters.

Figure 3:
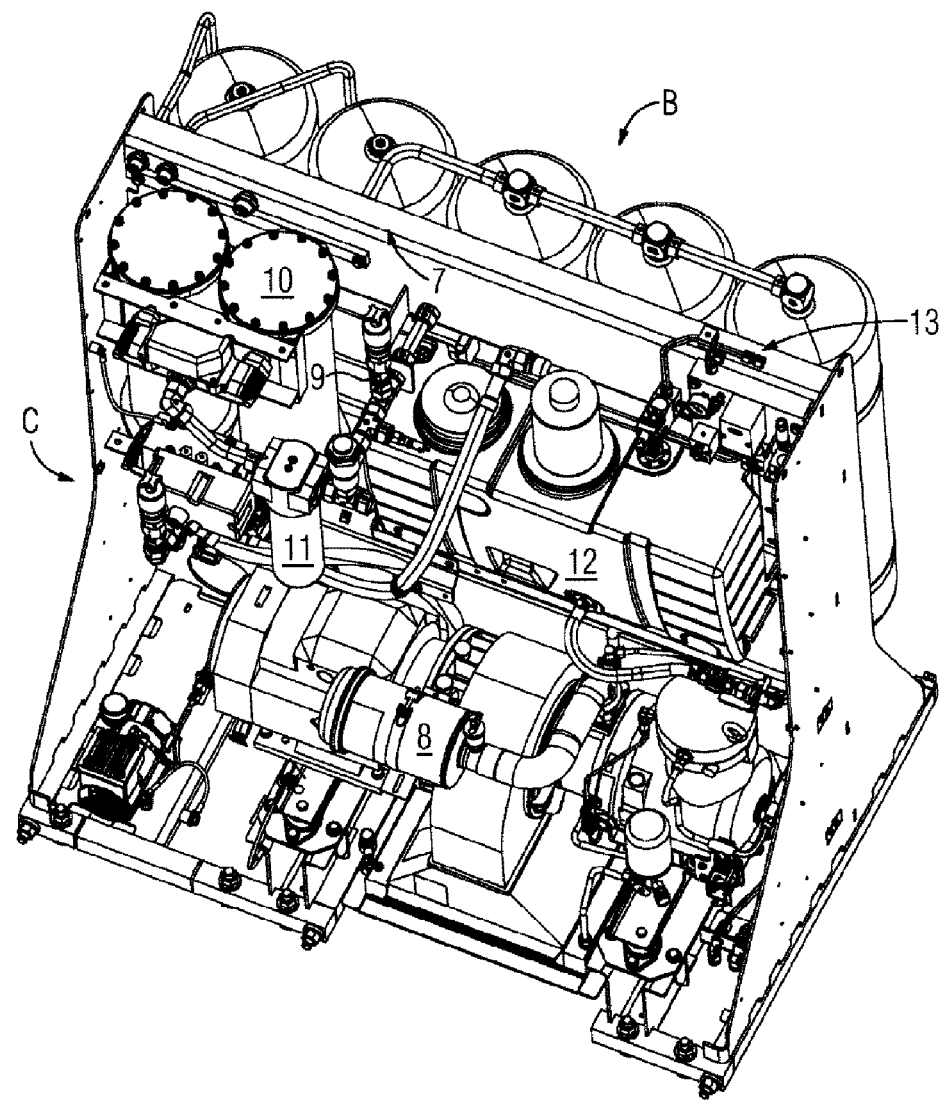
FIG. 3 shows an exemplary embodiment of the module C in a perspective illustration.

FIG. 3 shows a perspective illustration of the modules C and B back to back, with the module C facing the viewer. The module C is composed of a compressor 8, a minimum pressure valve 9, a dryer 10, a filter 11, a condensate container 12, a pantograph table 13 and further components which are not enumerated here conclusively. Furthermore, a pneumatic standard interface is again provided, which standard interface serves to connect further modules B or D or else to pneumatically connect the rail vehicle.

Figure 4:
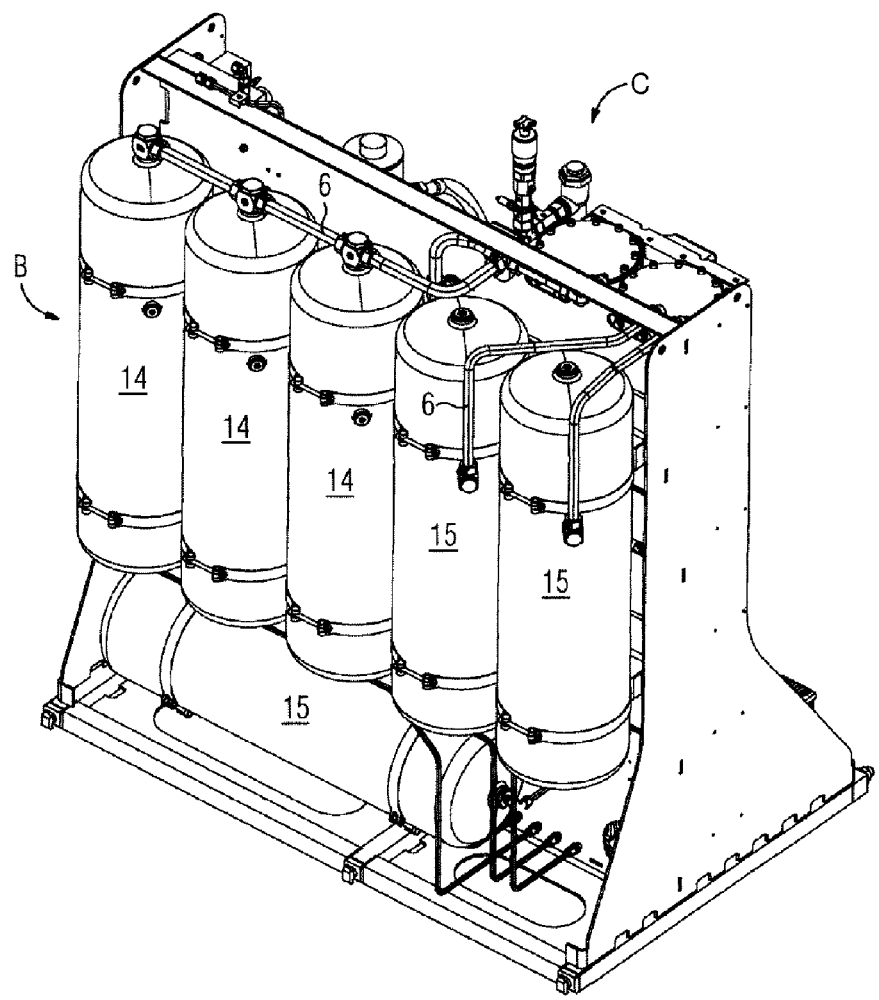
FIG. 4 shows an exemplary embodiment of the module B in a perspective illustration.

FIG. 4 shows, like FIG. 3, the modules B and C in a perspective illustration and in back-to-back arrangement, but in contrast to FIG. 3 the module B faces the viewer. It is apparent that the module B is composed of three main air vessels 14 and three auxiliary air vessels 15 which each have an internal volume of 75 liters and are embodied in a circular cylindrical fashion, with the hollow cylinders of the containers having an external diameter of approximately 300 mm.

The module B therefore has a depth of 300 mm, with the module C having a depth of 700 mm. In order to connect the main air vessels and the auxiliary air vessels, connecting pipes 6 are again provided. In this context, the modules C and B have the same width, expediently between 1 and 2 meters, and the same height H, expediently between 1 and 2 meters.

The modules shown in FIGS. 1 to 4 are provided for arrangement on various sides of a central corridor of a machine room of an electrically driven locomotive. Purely electrically driven locomotives usually have a central corridor. The brake device according to the invention can easily be divided between various sides of the central corridor by virtue of the modular configuration.

Figure 5:
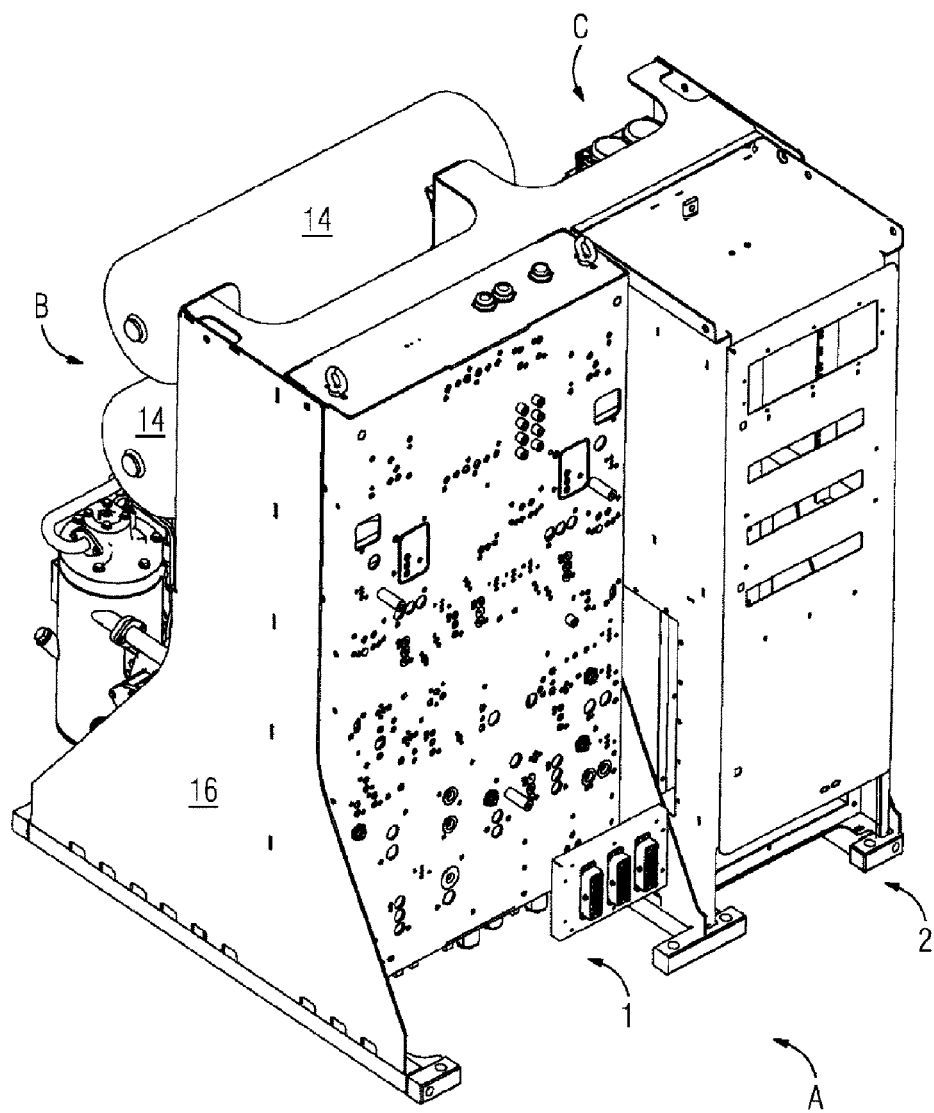
FIG. 5 shows an exemplary embodiment of the module A in a perspective illustration, said module A being combined with modules C and B at its rear side.

FIG. 5 shows the modules A, B and C in a perspective view, with the module A facing the viewer. The module C is arranged directly behind the module A, and the module D is offset into the plane of the drawing behind the module B. A common holding device 16 for holding the respective modules can be seen here. The modules A, B and C have common dimensions in the transverse direction and in height, but the module B is merely composed of two main pressure vessels 14, which extend in the horizontal direction in the exemplary embodiment shown in FIG. 5. The depth of the modules A, B and C is in total 1500 mm, with the module A having a depth of 500 mm, the module C having a depth of 700 mm, and the module B having a depth of 300 mm. The modules A, B and C which are composed in this way are provided for an arrangement in the middle of the machine space of a locomotive, which locomotive is a diesel-electrically driven locomotive with two side corridors. A diesel engine for driving a generator is arranged in the center of the machine room.

Figure 6:
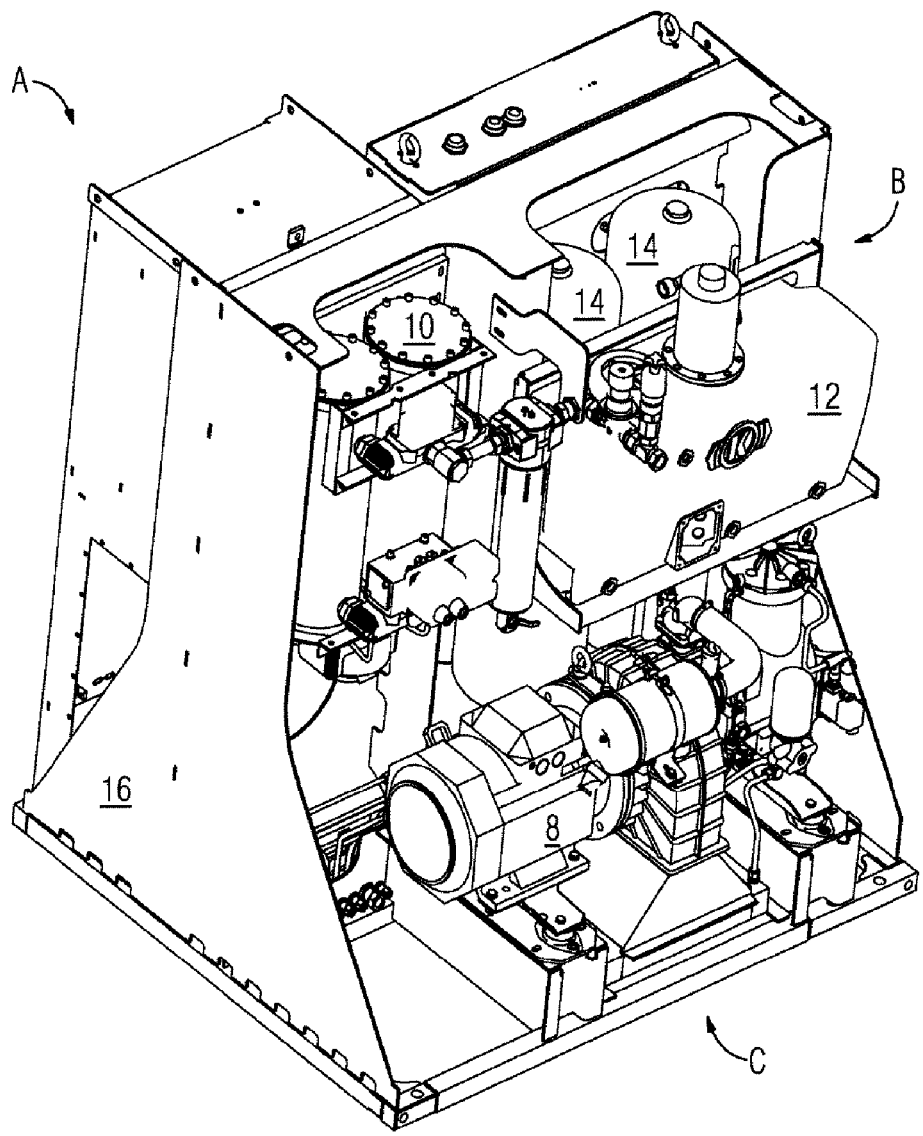
FIG. 6 shows the modules C and B according to FIG. 5 in a perspective view.

FIG. 6 shows the exemplary embodiment according to FIG. 5, but the module C is facing the viewer. Only the main pressure vessels 14 can be seen of the module B, which main pressure vessels 14 extend, however, in the perpendicular direction in contrast to the exemplary embodiment shown in FIG. 5. Module A is offset into the plane of the drawing. According to the exemplary embodiment shown, the modules B and C are interleaved into one another in depth. The dryer 10 of the module 10 is therefore arranged at the same depth as the main air vessels 14. Such interleaving is appropriate if, for example, not five but rather only two compressed air vessels are necessary in the module B, so that sufficient space for components of other modules, here C, remains in the module B. However, at this point it will be pointed out once more that the components illustrated in the figures are given only by way of example. Within the scope of the invention, the modules can also have other components which are not illustrated or specified here.

Figure 7:
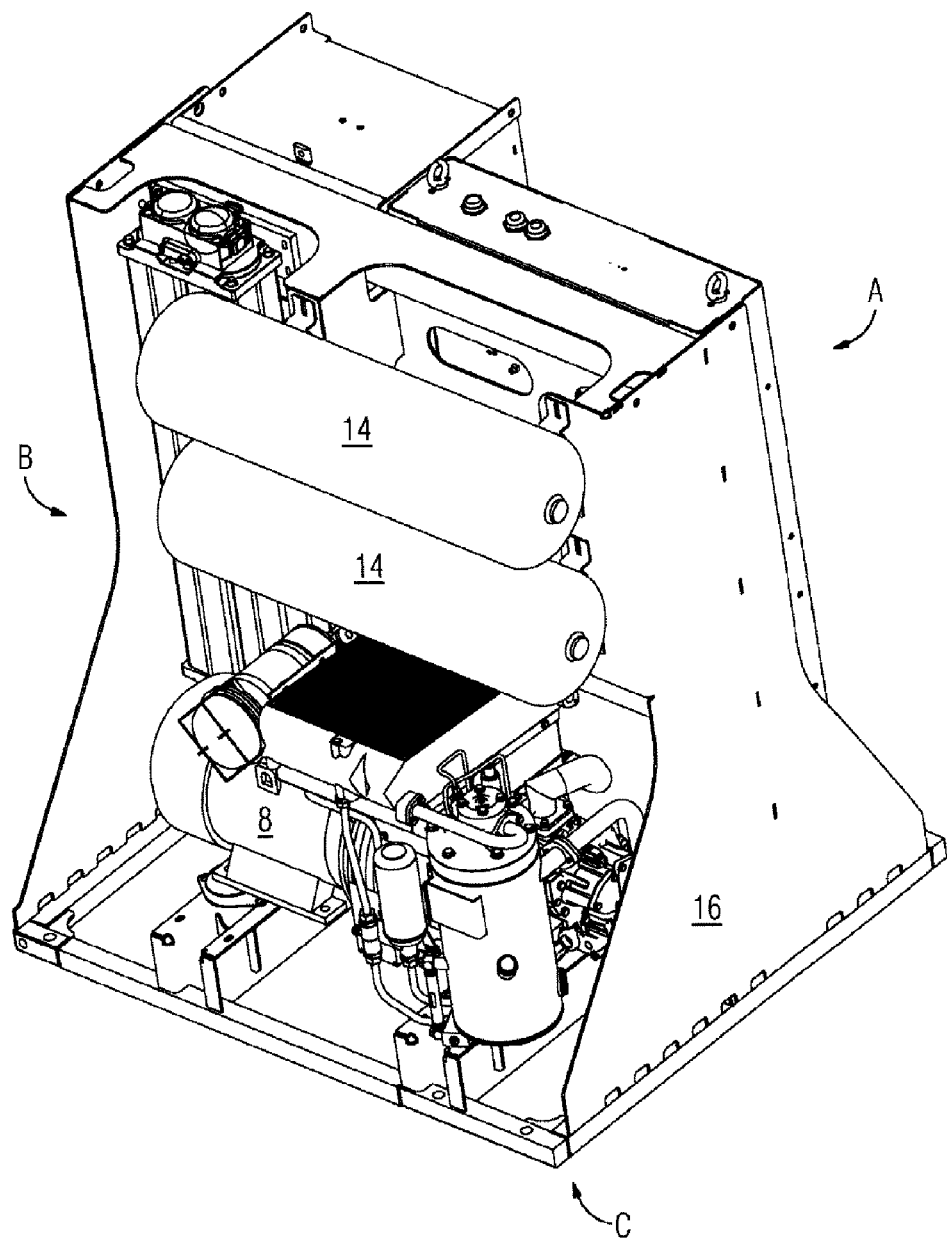
FIG. 7 shows a variation of the modules B and C according to FIG. 4 in a perspective illustration.

FIG. 7 shows a further configuration of a combination of the modules A, B and C, with the module A again facing away from the viewer and being offset into the plane of the drawing. The modules C and B are interleaved with one another in depth even more than in the exemplary embodiment according to FIG. 6. The main air vessels 14 of the module B in the upper region of the common device 16 are therefore arranged above the compressor 8 of the module C. The condensate container 12 which is not shown in FIG. 7 is, on the other hand, mounted behind the main air vessels 14 on the device 16. Such an interleaved arrangement which is offset in depth is likewise possible according to the present invention. However, within the sense of the invention, it is essential that the dimensioning of the components does not exceed the standard dimensions of the modules.

Figure 8:
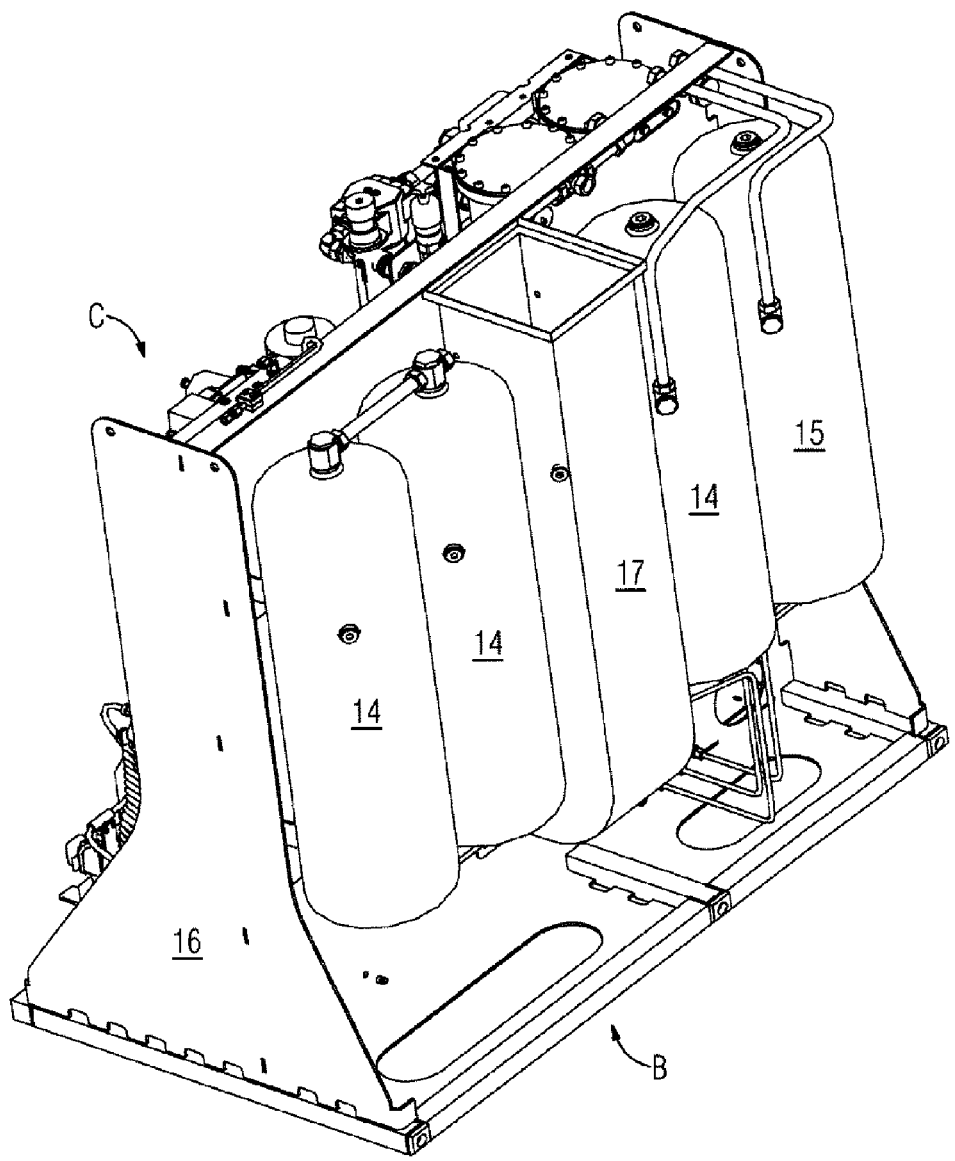
FIG. 8 shows a perspective illustration of a further exemplary embodiment of the module B.

FIG. 8 shows a further exemplary embodiment of the device according to the invention, with the two modules B and C being arranged back to back one behind the other. The module B, which in this exemplary embodiment has three perpendicular auxiliary pressure vessels 14 and one main pressure vessel 15, is facing the viewer. The module C can be seen facing away from the viewer on the rear side. With respect to the exemplary embodiment shown in FIG. 4, instead of a perpendicular main air vessel 14 an intake air shaft 17 for the compressor of the module C is attached to the device 16. The intake air shaft is a component of the module B. However, a horizontal auxiliary air vessel 15 as in FIG. 4 has been dispensed with in FIG. 8.

Figure 9:
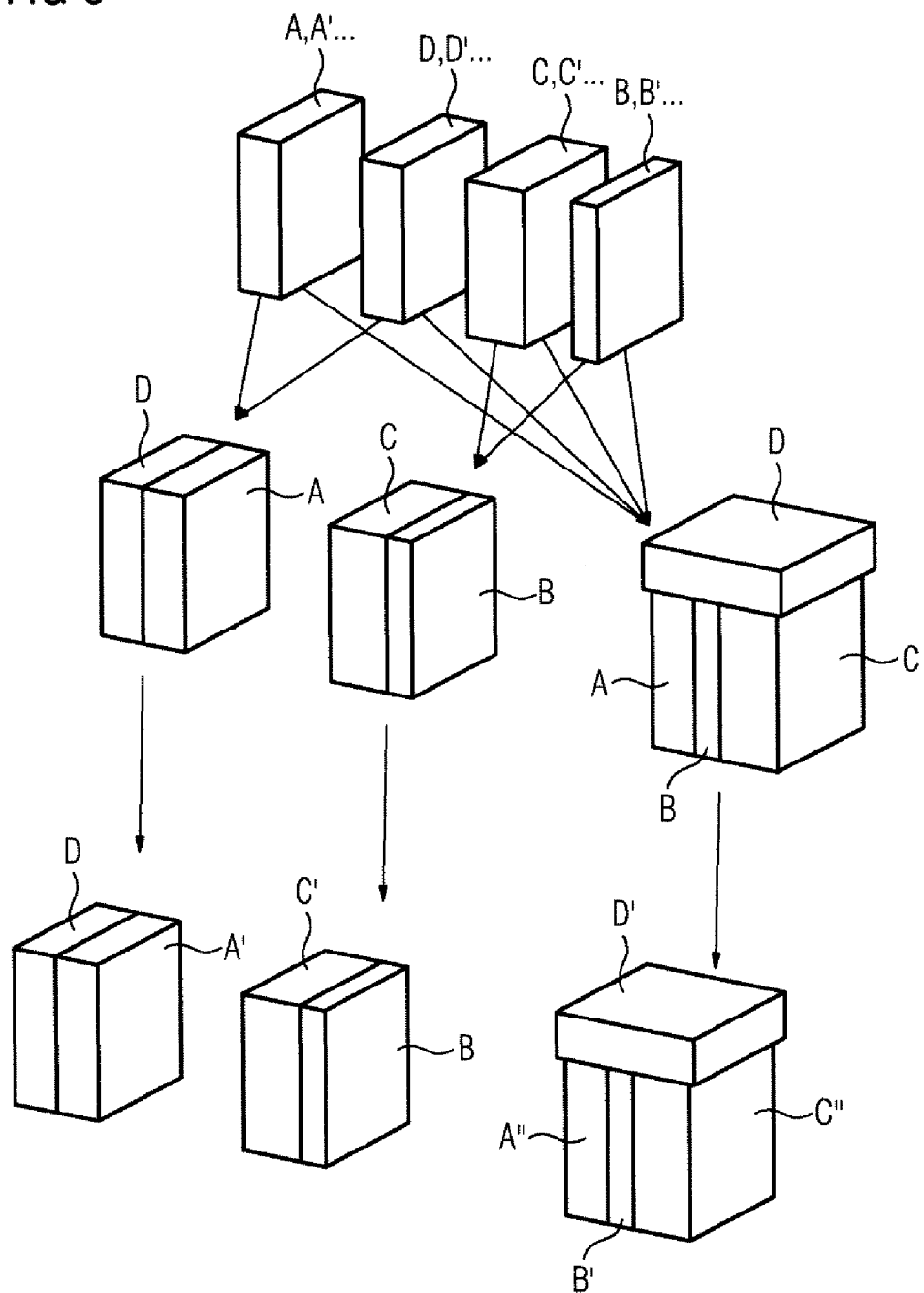
FIG. 9 shows a schematic illustration of the modules A, B, C and D in various combinations with one another.

In FIG. 9, the combination possibilities of the modules A, B and C or modified modules A', A", B', C', C" and D' are illustrated schematically. Reference will first be made to the combination of the modules A and D illustrated in conjunction with FIG. 1 and to the combination possibilities of the modules D' and A' which are slightly modified with respect thereto. It is apparent that the modules A and D and also A' and D' have the same width dimension and height dimension so that the precisely fitting back-to-back arrangement according to the invention is made possible. The same also applies correspondingly to modules C, C', B and B', which each have the same dimension as the modules A, A', D and D' in the lateral direction and in the vertical direction. According to FIGS. 6 and 7, a combination of the modules A, B, C and D is again illustrated in FIG. 9, in the column illustrated on the right. However, in FIG. 9 the module D is arranged above the modules A, B and C. The module D is therefore arranged inside the car body of a locomotive, for example under the roof of the rail vehicle. The same correspondingly applies to the combinations of A', A", B', C', C" and D'.

For the sake of clarity, reference will be made once more to the fact that the module references which are represented by single or double prime signs, that is to say for example A' or A" stand for variants within the interior of the module A. The modules A, A' and A" therefore have different components but have the same dimensions in terms of their width and height.

The invention claimed is:

1. A brake system for a rail-guided tractive vehicle, comprising:
    a brake device having predefined spatial dimensions, said brake device including:
        electronic, pneumatic, and mechanical components each accommodated in predefined modules;
        each of said modules having predefined spatial dimensions;
        each of said modules having at least one electrical or pneumatic module vehicle interface with a common predefined spatial position within said module and with a predefined operational size parameter;
    vehicle interfaces for connecting said module vehicle interfaces of said brake device to the tractive vehicle.

2. The brake system according to claim 1, wherein said modules include at least two modules selected from the group consisting of modules A, B, C, and D.

3. The brake system according to claim 2, wherein module A comprises a brake panel having pneumatic components and an electronic cabinet having electronic components.

4. The brake system according to claim 2, wherein each of said modules B and D includes circular-cylinder-shaped compressed air vessels with a diameter of 500 mm and/or 300 mm.

5. The brake system according to claim 2, wherein module C includes a compressor, an air dryer, air filters, a condensate container, a minimum pressure valve, and an auxiliary compressor or an auxiliary pressure supply.

6. The brake system according to claim 1, wherein the group of predefined modular dimensions includes modular dimensions of 300 mm, 500 mm and 700 mm.

7. The brake system according to claim 1, wherein said modules include at least two modules selected from the following group of modules:
    module A comprising a brake panel having pneumatic components and an electronic cabinet having electronic components;
    module B comprising circular-cylinder-shaped compressed air vessels with a diameter of 500 mm and/or 300 mm;
    module C comprising a compressor, an air dryer, air filters, a condensate container, a minimum pressure valve, and an auxiliary compressor or an auxiliary pressure supply; and
    module D comprising circular-cylinder-shaped compressed air vessels with a diameter of 500 mm and/or 300 mm.

8. The brake system according to claim 1, wherein said modules have, in an end view, a predefined width in a lateral direction, a predefined height, and a depth selected from a group of predefined modular dimensions.

9. The brake system according to claim 1, wherein modules are combinable with one another in said brake device and an exchange of a component of said components is limited to a respective module in which said component is provided.

10. The brake system according to claim 1, wherein said module vehicle interface of at least one said module has a common predefined spatial position within said brake device.

11. The brake system according to claim 1, wherein all of said modules have a common height and width.

12. The brake system according to claim 1, wherein a dimensioning of said components does not exceed a dimensioning of a module.

13. The brake system according to claim 1, wherein said modules are held by a common holding device.

14. The brake system according to claim 1, wherein said brake device is dividable between sides of a central corridor of a locomotive by virtue of the modular configuration of the brake device.

15. The brake system according to claim 1, wherein said brake device includes module A, A' or A" and module D, D' or D", or the brake device includes module B, B' or B" and module C, C' or C", or the brake device includes said module A, A' or A", said module B, B' or B" and said module C, C' or C", or the brake device includes said module A, A' or A", said module B, B' or B", said module C, C' or C" and said module D, D' or D".

16. A rail-guided tractive vehicle, particularly a locomotive, wherein the tractive vehicle comprises a brake device according to claim 1.

* * * * *